(12) United States Patent
Shajit et al.

(10) Patent No.: US 9,880,953 B2
(45) Date of Patent: Jan. 30, 2018

(54) SYSTEMS AND METHODS FOR NETWORK I/O BASED INTERRUPT STEERING

(71) Applicant: Tuxera Corporation, Helsinki (FI)

(72) Inventors: Bastian Arjun Shajit, Espoo (FI); Szabolcs Szakacsits, Helsinki (FI)

(73) Assignee: Tuxera Corporation, Espoo (FI)

( * ) Notice: Subject to any disclaimer, the term of this patent is extended or adjusted under 35 U.S.C. 154(b) by 303 days.

(21) Appl. No.: 14/589,185

(22) Filed: Jan. 5, 2015

(65) Prior Publication Data

US 2016/0196222 A1 Jul. 7, 2016

(51) Int. Cl.
*G06F 9/00* (2006.01)
*G06F 13/24* (2006.01)
*G06F 9/48* (2006.01)
*H04L 12/26* (2006.01)

(52) U.S. Cl.
CPC ............ *G06F 13/24* (2013.01); *G06F 9/4812* (2013.01); *H04L 43/0888* (2013.01)

(58) Field of Classification Search
None
See application file for complete search history.

(56) References Cited

U.S. PATENT DOCUMENTS

| | | | | |
|---|---|---|---|---|
| 6,256,660 B1 * | 7/2001 | Govindaraju | ........... | G06F 13/24 709/200 |
| 7,953,915 B2 * | 5/2011 | Ge | ........................ | G06F 9/4812 710/260 |
| 7,962,314 B2 * | 6/2011 | Chernoff | ................. | G06F 9/542 702/121 |
| 8,775,830 B2 * | 7/2014 | Sur | ......................... | G06F 1/206 713/300 |
| 8,782,645 B2 * | 7/2014 | Breternitz | ............. | G06F 9/5083 718/100 |
| 8,799,547 B2 * | 8/2014 | Mahadevan | .......... | G06F 9/4812 710/260 |
| 8,908,517 B2 * | 12/2014 | Filsfils | .................... | H04L 45/38 370/235 |
| 8,949,836 B2 * | 2/2015 | Comparan | .......... | G06F 9/30043 718/102 |
| 9,354,681 B2 * | 5/2016 | Rash | ......................... | G06F 1/26 |
| 9,536,089 B2 * | 1/2017 | Sallam | .................. | G06F 21/566 |
| 9,553,853 B2 * | 1/2017 | Kantecki | ............. | H04L 63/0442 |
| 9,563,585 B2 * | 2/2017 | Tian | ........................ | G06F 8/451 |
| 2005/0027793 A1 * | 2/2005 | Hass | ....................... | H04L 49/15 709/200 |
| 2006/0112208 A1 * | 5/2006 | Accapadi | ................ | G06F 13/26 710/265 |

(Continued)

OTHER PUBLICATIONS

International Search Report and Written Opinion for PCT/US16/12074 dated Mar. 17, 2016, 7 pp. 11.

(Continued)

*Primary Examiner* — Cheng-Yuan Tseng
(74) *Attorney, Agent, or Firm* — J. Fish Law, PLLC

(57) ABSTRACT

Systems and techniques for managing network processing on a central processing unit including multiple cores are described. Techniques may determine respective resource utilization for one or more processing cores. In one example resource utilization for cores may be determined based on one or more of task utilization time, processor load based on hardware interrupts, cycles spent on processing network packets, utilization based on software interrupts, and idle time. Interrupts may be steered to a core based on resource utilization.

22 Claims, 10 Drawing Sheets

(56) References Cited

U.S. PATENT DOCUMENTS

| | | | |
|---|---|---|---|
| 2011/0055838 A1* | 3/2011 | Moyes | G06F 9/4881 |
| | | | 718/102 |
| 2011/0107344 A1* | 5/2011 | Kim | G06F 9/5088 |
| | | | 718/105 |
| 2011/0320715 A1 | 12/2011 | Ickman et al. | |
| 2012/0131309 A1 | 5/2012 | Johnson et al. | |
| 2012/0185462 A1 | 7/2012 | Albrecht et al. | |
| 2013/0066885 A1 | 3/2013 | Komuves | |
| 2013/0086159 A1 | 4/2013 | Gharachorloo et al. | |
| 2013/0204825 A1 | 8/2013 | Su | |
| 2013/0212493 A1 | 8/2013 | Krishnamurthy | |
| 2013/0318334 A1* | 11/2013 | Waskiewicz, Jr. | G06F 9/3861 |
| | | | 712/244 |
| 2014/0089936 A1* | 3/2014 | Chang | G06F 9/4881 |
| | | | 718/105 |
| 2014/0101306 A1 | 4/2014 | Murgia | |
| 2014/0317265 A1* | 10/2014 | James | H04L 67/1004 |
| | | | 709/224 |
| 2014/0331236 A1 | 11/2014 | Mitra et al. | |
| 2015/0324234 A1* | 11/2015 | Chang | G06F 9/5033 |
| | | | 718/104 |
| 2015/0355700 A1* | 12/2015 | Pusukuri | G06F 1/329 |
| | | | 713/323 |
| 2016/0091949 A1* | 3/2016 | Buhot | G06F 1/324 |
| | | | 713/320 |

OTHER PUBLICATIONS

International Search Report and Written Opinion for PCT/US2014/054702 dated Nov. 19, 2014, 7 pp.

\* cited by examiner

SYSTEMS AND METHODS FOR NETWORK I/O BASED INTERRUPT STEERING

TECHNICAL FIELD

This disclosure relates to systems and methods for data processing and more particularly to techniques for enabling processing of network accessible data.

BACKGROUND

Digital data may be stored on multiple sources including, removable storage devices including, for example, memory cards and removable drives. Removable storage devices may be connected to a network to create network based storage devices, for example, a local media server. Further, digital data may originate from an online service provider, for example, a so-called cloud-based storage service or an online media service provider. Devices including laptop or desktop computers, tablet computers, televisions, digital video recorders, set-top boxes, digital media players, video gaming devices, video game consoles, audio systems, and cellular telephones, including so-called smart phones, may access network based storage devices through a network interface. When a user accesses data through a network interface, network input/output (I/O or IO) interrupts may be generated. Devices may utilize computing resources to handle network I/O interrupts.

Current devices may handle network interrupts in a less than ideal manner. Inefficient processing of network interrupts may cause access to digital data through a network connection to be hindered and may cause computing resources to be wasted.

SUMMARY

In general, this disclosure describes techniques for enabling efficient processing of network accessible data. In particular, this disclosure describes systems and techniques for handling interrupts. In one example, interrupts may be generated when data is received or transmitted over a network interface, e.g., network (I/O) interrupts. In one example, the techniques described herein may utilize a dynamic scheduler function that can be applied to any emerging heterogeneous multi-core processor system which employs an interrupt driven I/O mechanism. In one example, a scheduler function may dynamically identify and quantify certain aspects of a system in order to improve the data processing efficiency, both over a network and/or on a storage device by effectively utilizing the immense parallelism that multi-core processors may provide. This may increase the overall read/write and/or receive/send performance over a network.

According to one example of the disclosure, a method for managing network processing on a processing unit including multiple cores comprises determining whether a processing core handling interrupts associated with network IO is overloaded, upon determining the processing core is overloaded, determining a bottleneck for the processing core, and steering an interrupt associated with network IO to at least a second processing core of the processing unit based on the determined bottleneck.

According to another example of the disclosure, a device for managing network processing on a central processing unit including multiple cores comprises one or more processors configured to determine whether a processing core handling interrupts associated with network IO is overloaded, upon determining the processing core is overloaded, determine a bottleneck for the processing core, and steer an interrupt associated with network IO to at least a second processing core of the processing unit based on the determined bottleneck.

According to another example of the disclosure, a non-transitory computer-readable storage medium comprises instructions stored thereon, that upon execution, cause one or more processors of a device to determine whether a processing core handling interrupts associated with network IO is overloaded, upon determining the processing core is overloaded, determine a bottleneck for the processing core, and steer an interrupt associated with network IO to at least a second processing core of the processing unit based on the determined bottleneck.

According to another example of the disclosure, an apparatus for managing network processing on a central processing unit including multiple cores comprises means for determining whether a processing core handling interrupts associated with network IO is overloaded, means for upon determining the processing core is overloaded, determining a bottleneck for the processing core, and means for steering an interrupt associated with network IO to at least a second processing core of the processing unit based on the determined bottleneck.

The details of one or more examples are set forth in the accompanying drawings and the description below. Other features, objects, and advantages will be apparent from the description and drawings, and from the claims.

DETAILED DESCRIPTION

As described in detail below, network I/O may cause hardware and software interrupts to be generated. Typical operating systems, in general, do not utilize central processing unit (CPU) processing powers equally, especially when the processing requirements encountered by a system vary drastically. For example, in the case of a network device, where interrupts are generated based on a traffic pattern that can be completely different at each point in time, a typical operating system may simply cause all of the network based interrupts to be handled by a single processing core. This may overload the core and degrade overall performance of a device during a period of high traffic. In one example, the systems and techniques described herein may steer I/O handling to CPU paths (e.g., cores) which will yield increased (up to a theoretical maximum) processing efficiency. In one example, a scheduler function may dynamically identify and quantify certain aspects of a device in order to improve data processing efficiency. A schedule function may be based on an algorithm configured to perform one or more of runtime task allocation, hardware interrupt mitigation, and/or software interrupt steering. The techniques described herein may be used to increase the performance of Network Attached Storage (NAS) devices, such as, for example, routers, access points, etc. This may improve the transfer of data over the network during data access.

It should be noted that the Linux operating system includes mechanisms called Receive Packet Steering (RPS) and Transmit packet Steering (XPS). Each of RPS and XPS forward network packets to individual CPU queues for processing. RPS and XPS packet steering are based on creating a hash of the packet tuple and then distributing it among the individual network queues. It should be noted that this kind of steering is usually arbitrary. Further, although RPS and XPS may be efficient if there are multiple queues supported by the network driver, in most cases network drivers do not support multiple queues. In contrast to RPX and XPS, the example techniques described herein do not focus on packet steering, but instead on steering the instructions/triggers that will eventually process those packets and dynamically adapting the steering strategy based on the ever changing CPU resource availability for processing.

Figure 1:
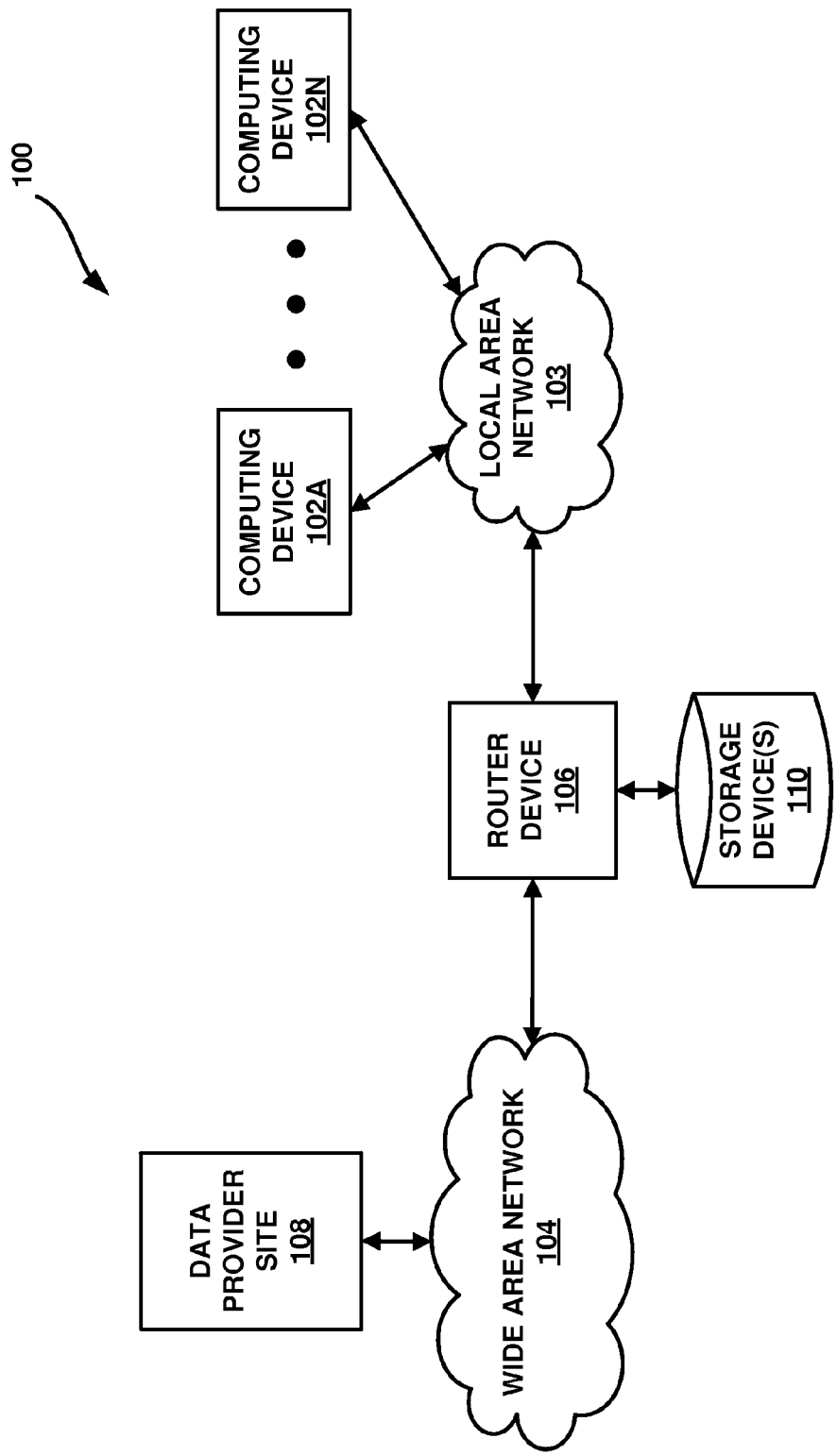
FIG. 1 is a conceptual diagram illustrating an example system that may implement one or more techniques of this disclosure.

FIG. 1 is block diagram illustrating an example of a system that may implement one or more techniques described in this disclosure. System 100 may be configured to enable a user to access data over a network in accordance with the techniques described herein. In the example illustrated in FIG. 1, system 100 includes one or more computing devices 102A-102N, local area network 103, wide area network 104, router device 106, and data provider site 108. As further illustrated in FIG. 1, storage device(s) 110 may be operably coupled to router device 106. System 100 may include software modules operating on one or more servers. Software modules may be stored in a memory and executed by a processor. Servers may include one or more processors and a plurality of internal and/or external memory devices.

Memory devices may include any type of device or storage medium capable of storing data. A storage medium may include tangible or non-transitory computer-readable media. Computer readable media may include optical discs, flash memory, magnetic memory, or any other suitable digital storage media. In some examples, a memory device or portions thereof may be described as non-volatile memory and in other examples portions of memory devices may be described as volatile memory. Examples of volatile memories may include random access memories (RAM), dynamic random access memories (DRAM), and static random access memories (SRAM). Examples of non-volatile memories may include magnetic hard discs, optical discs, floppy discs, flash memories, or forms of electrically programmable memories (EPROM) or electrically erasable and programmable (EEPROM) memories. When the techniques described herein are implemented partially in software, a device may store instructions for the software in a suitable, non-transitory computer-readable medium and execute the instructions in hardware using one or more processors.

In the example illustrated in FIG. 1, computing devices 102A-102N may include any device configured to enable a user to cause data, such as, for example, documents, music, videos, images, to be transmitted to and/or received from local area network 103 and wide area network 104. For example, computing devices 102A-102N may be equipped for wired and/or wireless communications and may include set top boxes, digital video recorders, televisions, desktop, laptop, or tablet computers, gaming consoles, mobile devices, including, for example, smart phones, cellular telephones, and personal gaming devices.

Each of local area network 103 and wide area network 104 may comprise any combination of wireless and/or wired communication media. Each of local area network 103 and wide area network 104 may include coaxial cables, fiber optic cables, twisted pair cables, wireless transmitters and receivers, routers, switches, repeaters, base stations, or any other equipment that may be useful to facilitate communications between various devices and sites. Local area network 103 and wide area network 104 may be distinguished based on types of access. For example, wide area network 104 may include a network configured to enable access to the World Wide Web, for example, the Internet. Local area network 103 may be configured to enable a user to access a subset of devices (e.g., home devices and computing devices located within a user's home). Such access may be limited to a particular set of users based on a set of rules provided by a firewall. Local area network 103 may be referred to as a personal network.

Each of local area network 103 and wide area network 104 may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards Institute (ETSI) standards, Internet Protocol (IP) standards, Wireless Application Protocol (WAP) standards, and IEEE standards, such as, for example, one or more of the IEEE 802 standards (e.g., Wi-Fi). In one example, computing devices 102A-102N may communicate over local area network 103 using a local networking protocol, such as for example, a protocol based on the IEEE 802 standards.

Referring again to FIG. 1, system 100 includes router device 106. Router device 106 may be configured to receive data from wide area network 104 and transmit data to a respective one of computing devices 102A-102N using local area network. In one example, router device 106 may include a so-called Wi-Fi router and, in one example, may be configured to receive data from a modem device (e.g., a cable modem) and wirelessly transmit data to one of computing devices 102A-102N. As illustrated in FIG. 1, storage device(s) 110 may be operably coupled to router device 106. Storage device(s) 110 may include a storage medium. As described above, a storage media may include optical discs, flash memory, magnetic memory, or any other suitable digital storage media. Storage device(s) 110 may be internal or external memory and in some examples may include non-volatile storage elements. Storage device(s) 110 may include memory cards (e.g., a Secure Digital (SD) memory card, including Standard-Capacity (SDSC), High-Capacity (SDHC), and eXtended-Capacity (SDXC) formats), internal/external hard disk drives, and/or internal/external solid state drives. Data stored on storage device(s) 110 may be stored according to a defined file system, such as, for example FAT, exFAT, NFTS, NTFS-3G, HFS+, VFAT, and/or EXT4 files systems. In the example where storage device(s) 110 include memory cards or external hard disk drives, router device 106 may be configured to receive a memory card (e.g., an SD memory card) or a disk drive (e.g., through a USB port). When operably coupled to router 106, a storage device 110 may be accessible by one or more of computing devices 102A-102N and may be referred to as a network attached storage (NAS) device or a local media server.

Referring again to FIG. 1, data provider site 108 may be in communication with wide area network 104. Data provider site 108 represents an example of an online data service provider. A data service provider 108 may include a service that enables a user to access digital data through any computing device connected to wide area network 104. In this manner, data service provider may enable a user to access data regardless of a user's physical location. A data provider site may include a cloud storage service and/or a media service provider site. In the example where data includes multimedia, a data service provider may stream multimedia to a computing device. Commercial examples of media streaming services include Pandora, YouTube, and Netflix. In this manner, system 100 may enable computing devices 102A-102N to access data through various networks.

Figure 2:
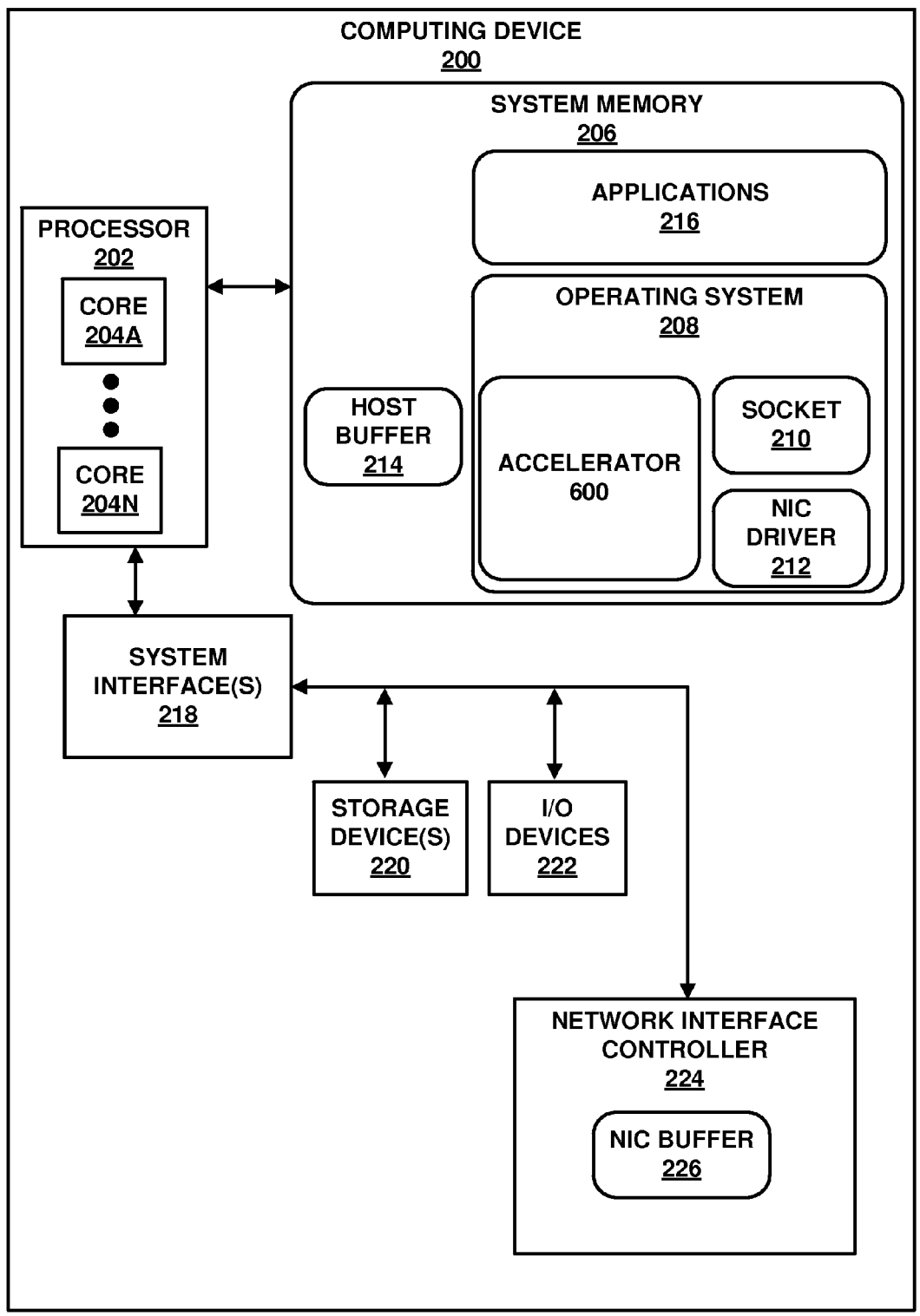
FIG. 2 is a block diagram illustrating an example of a computing device that may implement one or more techniques of this disclosure.

FIG. 2 is a block diagram illustrating an example of a computing device that may implement one or more techniques of this disclosure. Computing device 200 may include one or more processors and a plurality of internal and/or external storage devices. Computing device 200 may be an example of a device configured send/receive data using a network, e.g., local area network 103 and/or wide area network 104. Computing device 200 may be equipped for wired and/or wireless communications and may include devices, such as, for example, desktop or laptop computers, mobile devices, smartphones, cellular telephones, tablet devices, set top boxes, personal gaming devices, and automotive infotainment systems. As illustrated in FIG. 2, computing device 200 includes processor(s) 202, system memory 206, system interface(s) 218, storage device(s) 220, I/O device(s) 222, and network interface controller 224. It should be noted that although example computing device 200 is illustrated as having distinct functional blocks, such an illustration is for descriptive purposes and does not limit computing device 200 to a particular hardware or software architecture. Functions of computing device 200 may be realized using any combination of hardware, firmware and/or software implementations.

Processor 202 may be configured to implement functionality and/or process instructions for execution in computing device 200. Processor 202 may be capable of retrieving and processing instructions, code, and/or data structures for implementing one or more of the techniques described herein. Instructions may be stored on a computer readable medium, such as system memory 206 or storage devices 222. Processor 202 may include digital signal processors (DSPs), general purpose microprocessors, application specific integrated circuits (ASICs), field programmable logic arrays (FPGAs), or other equivalent integrated or discrete logic circuitry. Processor 202 may include one or more multi-core central processing units. In the example illustrated in FIG. 2 processor 202 includes processing cores 204A-204N. Each of cores 204A-204N may be an independent central processing unit (CPU) capable of retrieving and processing instructions, code, and/or data structures. In one example, a processor may include two or up to 64 cores. As described in detail below, a core may receive an interrupt when data is received from or sent to a network. Each of cores 204A-204N may be configured to handle interrupts according to the techniques described herein.

System memory 206 may be configured to store information that may be used by computing device 200 during operation. System memory 206 may be described as a non-transitory or tangible computer-readable storage medium. In some examples, system memory 206 may provide temporary memory and/or long-term storage. In some examples, system memory 206 or portions thereof may be described as non-volatile memory and in other examples portions of system memory may be described as volatile memory. In one example, system memory 206 may include an internal hard disk drive and/or an internal flash memory.

As illustrated in FIG. 2, system memory 206 includes operating system 208, host buffer 214, and applications 216 stored thereon. Operating system 208 may be configured to facilitate the interaction of applications with processor 202, and other hardware components of computing device 200. Operating system 208 may be an operating system designed to be installed on laptops and desktops. For example, operating system 208 may be a Windows® operating system, Linux, or Mac OS. Operating system 208 may be an operating system designed to be installed on laptops, desktops, smartphones, tablets, set-top boxes, and/or gaming devices. For example, operating system 208 may be a Windows®, Linux, Mac OS, Android, iOS, Windows Mobile®, or a Windows Phone® operating system. As illustrated in FIG. 2, operating system 208 includes socket 210, network interface card driver 212, and accelerator 600 and system memory 206 includes host buffer 214. Each of socket 210, network interface card driver 212, accelerator 600, and host buffer 214 are described in greater detail below. It should be noted that network driver 212 may or may not be able to support multiple network queues. Further, it should be noted that although techniques are described herein according to particular example operating systems, the techniques described herein are not limited to a particular operating system.

Referring again to FIG. 2, applications 216 may include any applications implemented within or executed by computing device 200 and may be implemented or contained within, operable by, executed by, and/or be operatively/communicatively coupled to components of computing device 200. Applications 216 may include instructions that may cause processor 202 of computing device 200 to perform particular functions. Applications 216 may receive data from a network and may cause data to be transmitted to a network. Applications 216 may include algorithms which are expressed in computer programming statements, such as, for loops, while-loops, if-statements, do-loops, etc. Applications 216 may include media playback applications.

System interface(s) 218 may be configured to enable communication between components of computing device 200. In one example, system interface 218 comprises structures that enable data to be transferred from one peer device to another peer device or to a storage medium. For example, system interface 218 may include a chipset supporting PCI and PCIe bus protocols, proprietary bus protocols, Universal Serial Bus (USB) protocols, I²C, or any other logical and physical structure that may be used to interconnect peer devices. In one example, network interface controller 224 may be operably coupled to computing device 200 using a PCIe bus.

Storage device(s) 220 represents memory devices of computing device 200 that may be configured to store different amounts of information for different periods of time than system memory 206. Similar to system memory 206, storage device(s) 220 may also include one or more non-transitory or tangible computer-readable storage media. Storage device(s) 220 may be internal or external memory and in some examples may include non-volatile storage elements. Storage device(s) may include memory cards (e.g., a Secure Digital (SD) memory card, including Standard-Capacity (SDSC), High-Capacity (SDHC), and eXtended-Capacity (SDXC) formats), external hard disk drives, and/or an external solid state drive.

I/O device(s) 222 may be configured to receive input from and provide output to a user of computing device 200. Input may be generated from an input device, such as, for example, a touch-sensitive screen, a track pad, a joystick, a mouse, a keyboard, a microphone, a video camera, or any other type of device configured to receive input. Output may be provided to output devices, such as, for example speakers or a display device. In some examples, I/O device(s) 222 may be external to computing device 200 and may be operatively coupled to computing device 200 using a standardized communication protocol, such as for example, USB or High-Definition Media interface (HDMI).

Network interface controller 224 may be configured to enable computing device 200 to communicate with external computing devices via one or more networks. For example, network interface controller 224 may be configured to enable a computing device to communicate with other computing devices connected to local area network 103 and/or wide area network 104. Router device 106 may facilitate communication on local area network 103 and/or wide area network 104. Network interface controller 224 may be included as part of a network interface card, such as an Ethernet card, and may include an optical transceiver, a radio frequency transceiver, or any other type of device that can send and receive information. Network interface controller 224 may be configured to operate according to one or more telecommunication protocols such as, for example, Internet Protocol (IP), Transmission Control Protocol (TCP), and Ethernet protocol. In one example, network interface controller 224 is configured to receive an Ethernet frame on a wire. As illustrated in FIG. 2, network interface controller 224 includes network interface controller buffer 226. As described in detail below, network interface controller buffer 226 may be configured to store frames received from a network and frames to be sent to a network. The operation of network interface controller 224 is described in greater detail below with respect to FIGS. 4-6 and FIG. 8.

Figure 3:
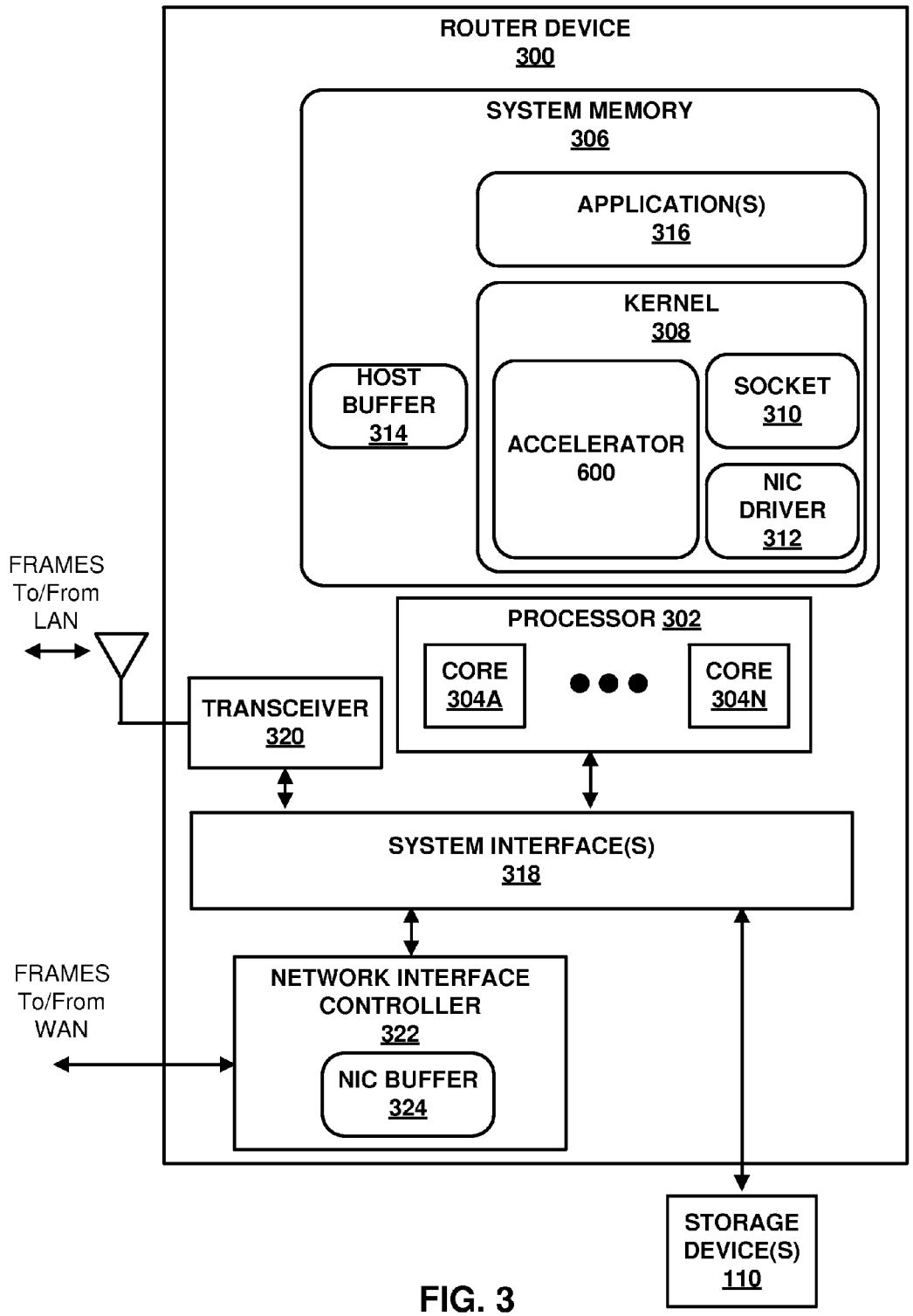
FIG. 3 is a block diagram illustrating an example of a router device that may implement one or more techniques of this disclosure.

As described above, router device 106 may facilitate communication on local area network 103 and/or wide area network 104. FIG. 3 is a block diagram illustrating an example of a router device that may implement one or more techniques of this disclosure. In the example illustrated in FIG. 3, external storage device(s) 110 may be operably coupled to router device 300. In this manner, router device 300 may be configured to enable a storage device to be used as a network attached storage (NAS) device or a local media server. In one example, router device 300 may be configured to receive and send data to wide area network 104 via a wired Ethernet connection and receive and send data to local area network 103 using a wired Ethernet connection and/or a wireless connection, thereby providing computing devices 102A-102N wireless access to data stored on storage device(s) 110. As illustrated in FIG. 3, router device 300 includes processor 302, system memory 306, system interface(s) 318, transceiver 320, and network interface controller 322.

In a manner similar to processor 202, described above with respect to FIG. 2, processor 302 may be configured to implement functionality and/or process instructions for execution in router device 300. Processor 302 may be capable of retrieving and processing instructions, code, and/or data structures for implementing one or more of the techniques described herein. Processor 302 may include one or more multi-core central processing units. In the example illustrated in FIG. 3, processor 302 includes processing cores 304A-304N. In one example, processor 302 may include the commercially available multi-core processors architectures. For example, processor 302 may include processor architectures developed by ARM, e.g., Cortex-A Series (e.g., A9-Dual-Core, A15-Dual-Core, etc.), Cortex-M Series, and Cortex-R Series. As described in detail below, a processing core may receive an interrupt when data is received from or sent to a network. Each of cores 304A-304N may be configured to handle interrupts according to the techniques described herein.

System memory 306 may be configured to store information that may be used by router device 300 during operation. System memory 306 may be described as a non-transitory or tangible computer-readable storage medium. In some examples, system memory 306 or portions thereof may be described as non-volatile memory and in other examples portions of system memory 306 may be described as volatile memory. As illustrated in FIG. 3, system memory 306 includes kernel 308, host buffer 314, and applications 316 stored thereon. Kernel 308 may be configured to facilitate the processing of instructions by processor 302. In one example, kernel 308 may include or be part of an embedded or real-time operating system. That is, in some examples, kernel 308 may be more compact than operating system 208 described above. In one example, kernel 308 may be based on the Linux kernel. As illustrated in FIG. 3, kernel 308 includes socket 310, network interface card driver 312, and accelerator 600 and system memory 306 includes host buffer 314. Each of socket 310, network interface card driver 312, accelerator 600, and host buffer 314 are described in greater detail below. It should be noted that network driver 312 may or may not be able to support multiple network queues. Further, it should be noted that although techniques are described herein according to particular example kernels, the techniques described herein are not limited to a particular kernel.

Referring again to FIG. 3, applications 316 may include any applications implemented within or executed by router device 300 and may be implemented or contained within, operable by, executed by, and/or be operatively/communicatively coupled to components of router device 300. Applications 316 may include instructions that may cause processor 302 of router device 300 to perform particular functions. Applications 316 may receive data from a network and may cause data to be transmitted to a network. System interface(s) 318 may be configured to enable communication between components of router device 300. For example, system interface 318 may include a chipset supporting PCI and PCIe bus protocols, proprietary bus protocols, Universal Serial Bus (USB) protocols, I²C, or any other logical and physical structure that may be used to interconnect peer devices.

Transceiver 320 may be configured to enable wireless communication with computing devices 102A-102N. Transceiver 320 may include various mixers, filters, amplifiers and other components designed for signal modulation, as well as one or more antennas and other components designed for transmitting and receiving data. In one example, transceiver 320 may enable relatively short-range communication channels, and may implement a physical channel structure similar to Wi-Fi, Bluetooth, or the like, such as by implementing defined 2.4, GHz, 3.6 GHz, 5 GHz, 60 GHz, and/or Ultrawideband (UWB) frequency band structures.

In a manner similar to that described above with respect to network interface controller 224, network interface controller 322 may be configured to enable router device 300 to facilitate communication on local area network 103 and/or wide area network 104. Network interface controller 322 may be included as part of a network interface card, such as an Ethernet card, and may include an optical transceiver, a radio frequency transceiver, or any other type of device that can send and receive information. Network interface 322 may be configured to operate according to one or more telecommunication protocols such as, for example, Internet Protocol (IP), Transmission Control Protocol (TCP), and Ethernet protocol. In one example, network interface controller 322 is configured to receive an Ethernet frame on a wire. As illustrated in FIG. 3, network interface controller 322 includes network interface controller buffer 324. As described in detail below, network interface controller buffer 324 may be configured to store frames received from a network and frames to be sent to a network. The operation of network interface controller 322 is described in greater detail below with respect to FIGS. 4-6 and FIG. 8.

As described above, network I/O may cause hardware and software interrupts to be generated. Each of computing device 200 and router device 300 may receive frames from a network, which may cause interrupts to be generated and processed. FIGS. 4-6 and FIG. 8 are conceptual diagrams illustrating examples of data processing flows. Each of NIC, NIC Buffer, NIC Driver, Core A, Core N, Host Buffer, Socket, and Application in FIGS. 4-6 and FIG. 8 may include any of corresponding components described above with respect to FIG. 2 and FIG. 3. It should be noted, that for the sake of brevity, aspects of data processing flows have been simplified in FIGS. 4-6 and FIG. 8. For example, a complete description of TCP, IP, and Ethernet protocol processing (e.g., checksum creation) is not provided herein. Simplifications in FIGS. 4-6 and FIG. 8 should not be construed to limit the scope and applicability of the techniques described herein.

Figure 4:
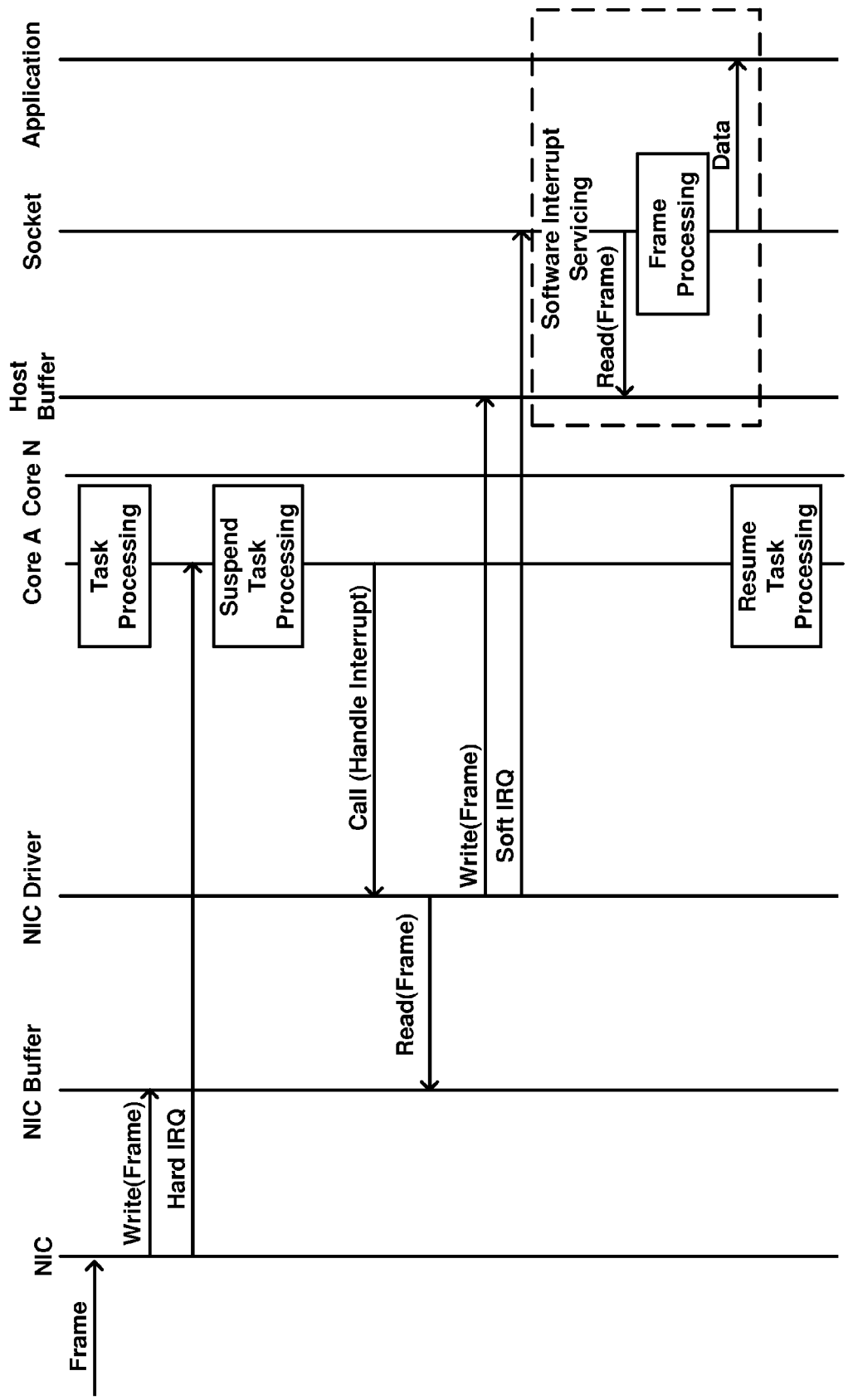
FIG. 4 is a conceptual diagram illustrating an example of a data processing flow according to one or more techniques of this disclosure.

FIG. 4 illustrates an example where a frame is received by computing device 200 or routing device 300. As illustrated in FIG. 4, network interface controller receives a frame (e.g., an Ethernet frame on a wire). Network interface controller writes the frame to network interface controller buffer. Network interface controller then asserts a hardware interrupt (e.g., a Linux Hard IRQ) to indicate the presence of a frame. That is, the hardware interrupt causes a core to suspend processing associated with applications that are currently running (e.g., runtime task processing). In the example illustrated in FIG. 4, core A of a processor is interrupted. An interrupted core causes network interface controller driver to acknowledge the hardware interrupt. The network interface controller driver may handle the hardware interrupt by reading the frame from the NIC buffer and writing the frame to a host buffer (i.e., network interface controller driver "frees" the frame). It should be noted that the term host may be used to distinguish a user area (e.g., an application) and a kernel area from a device area (e.g., NIC), where a user area and a kernel area are included in a host. The purpose of hardware interrupts during frame reception is to ensure frames are transferred from the device area to the host area without being dropped, e.g., due to a NIC buffer overflow.

After a frame has been written to the host buffer a software interrupt (e.g., a Linux Soft IRQ) may be scheduled and a frame may be processed at a host level. That is, upper layer frame processing may be performed. A software interrupt may cause a kernel to process packets included in a frame. This may be referred to as software interrupt servicing. In one example, software interrupt servicing may preempt applications from running on a processing core, but still allow hardware interrupts to be asserted. In the example illustrated in FIG. 4, a socket reads a frame from the host buffer, processes a frame, and provides the data from the frame to an application. It should be noted that the term socket as used herein may refer to an endpoint of a communication flow. Frame processing may include decapsulating data from one or more communication protocols. For example, once a frame reaches an endpoint, packets may be extracted from the frame and data may be extracted from the packets (e.g., TCP packets). As illustrated in FIG. 4, after a frame has been processed, data may be accessed by an application, for example, a web browser application may update a webpage using data received in a frame. After an application receives data, frame reception is complete and a core may resume task processing.

Figure 5:
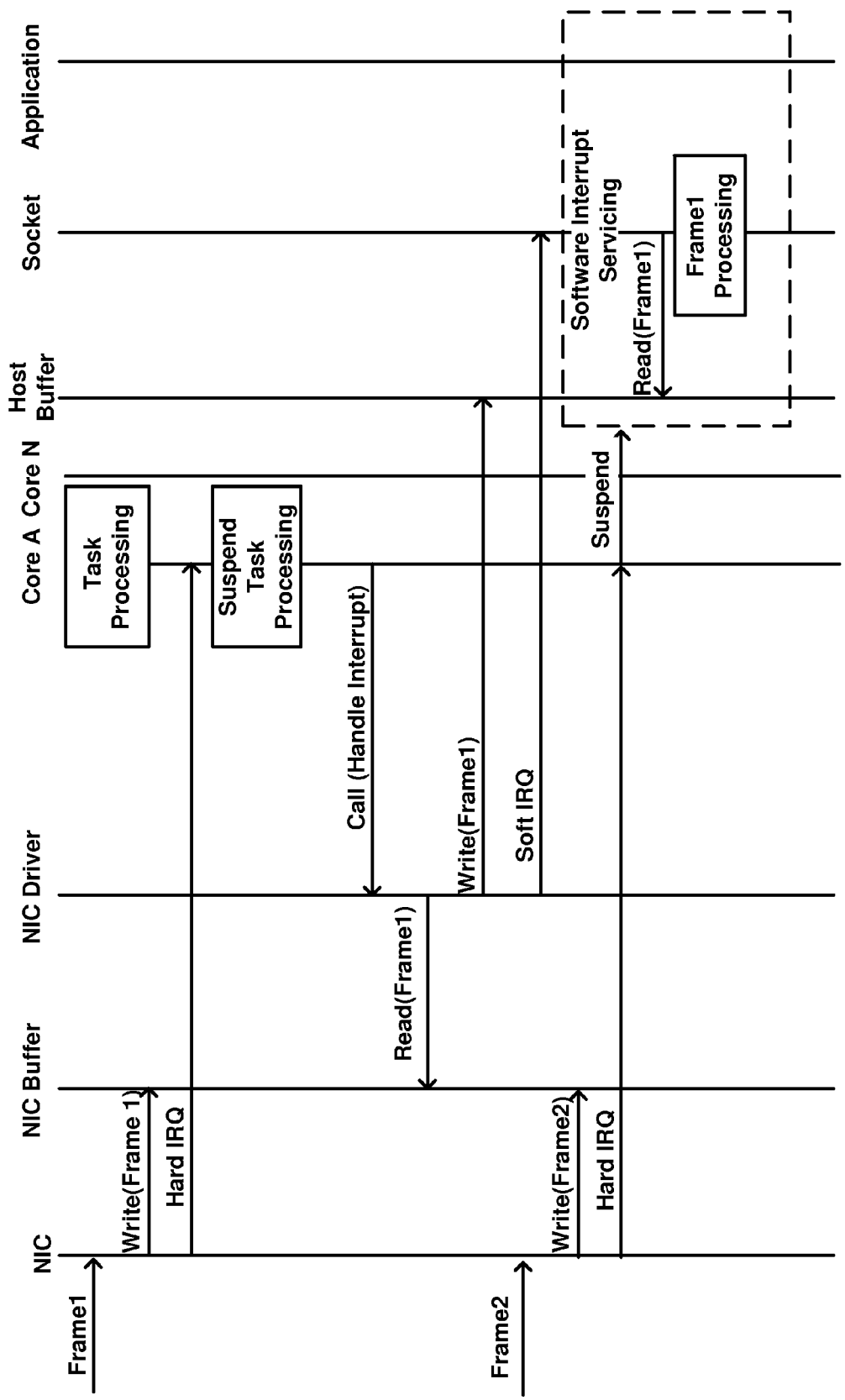
FIG. 5 is a conceptual diagram illustrating an example of a data processing flow according to one or more techniques of this disclosure.

As described above, during a period of high traffic network I/O interrupts (i.e., hardware and software interrupts) may overload a core and degrade overall performance of a device. FIG. 5 is a conceptual diagram illustrating an example of a data processing flow. FIG. 5 illustrates an example where multiple frames are received by computing device 200 or routing device 300. The flow illustrated in FIG. 5 is similar to the flow illustrated in FIG. 4, with the exception that a second frame is received prior to completion of software interrupt servicing of a first frame. As such, as illustrated in FIG. 5, software interrupt servicing is suspended due to a hardware interrupt caused by reception of the second frame and the resumption of application related processing is delayed. It should be noted that in a typical scenario the number of interrupts generated may correspond to network applications where it is desirable to have transfer rates of at least dozens of MB/s. The techniques described herein may be particularly useful for improving performance for high data transfer applications. For example, a user may wish to copy a large file (e.g., multiple GBs) from a network attached storage device to a local hard disk drive. An example of such an application may utilize the Samba software suite.

Figure 6:
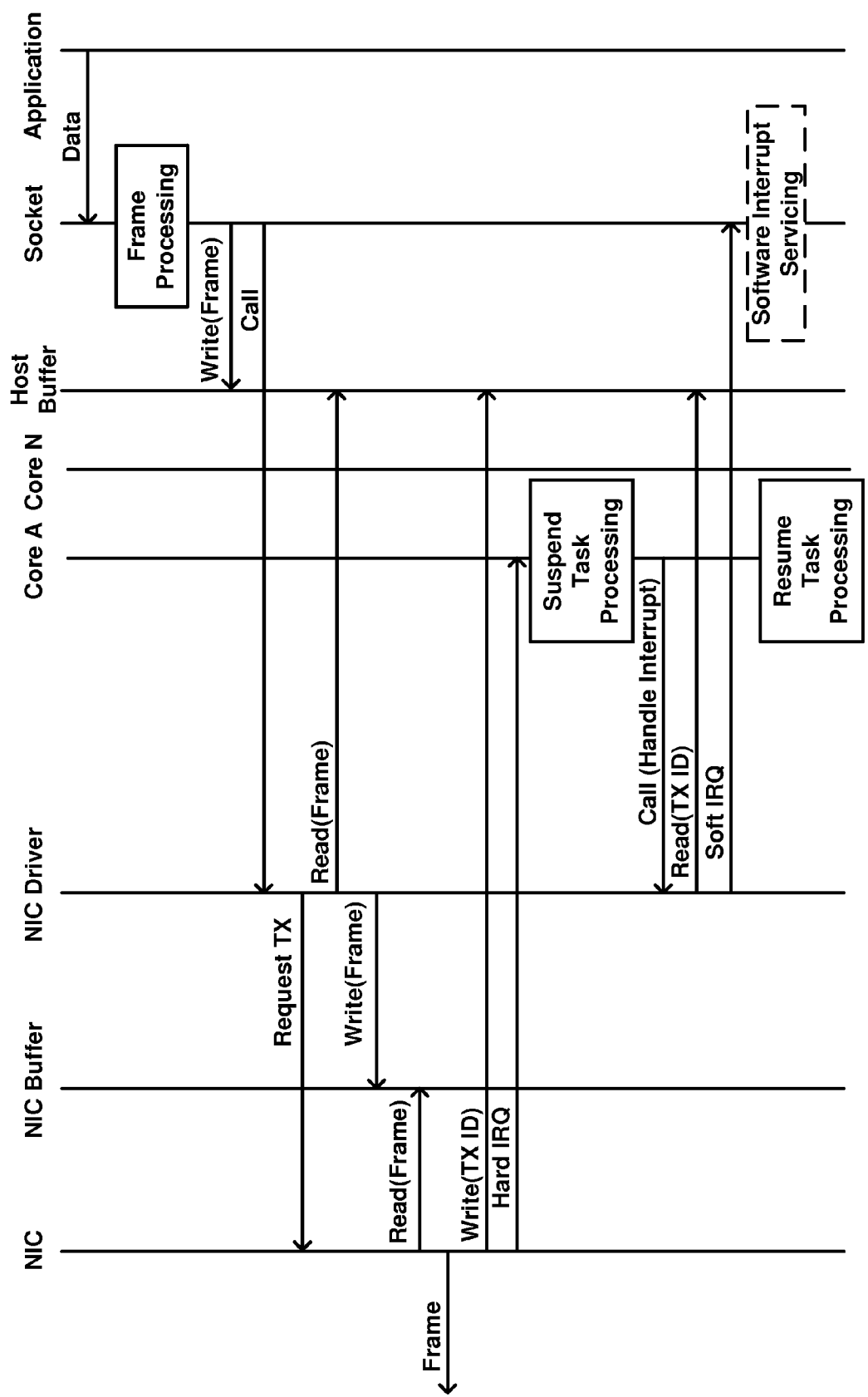
FIG. 6 is a conceptual diagram illustrating an example of a data processing flow according to one or more techniques of this disclosure.

Hardware and software interrupts may also be generated when a device is transmitting data. FIG. 6 illustrates an example where a frame is transmitted by computing device 200 or routing device 300. In the example illustrated in FIG. 6, an application may provide data it desires to transmit to a socket. Frame processing may be performed such that data is encapsulated in a frame and a frame is written to a host buffer. Once a frame is written to a host buffer NIC driver may be called. NIC driver may be notified that transmission of a frame is requested. NIC driver may request NIC to physically transmit a frame. After transmission is requested, a frame may be written to NIC buffer and network interface controller may send the frame (e.g., send an Ethernet frame on a wire). The process of data being sent from an application may include one or more software interrupts. For the sake brevity, software interrupts that may be generated during this process are not illustrated in FIG. 6.

As illustrated in FIG. 6, once network interface controller transmits a frame, network interface controller causes a transmission identifier (e.g., frame numbers) to be written to a host buffer and causes a processing core to be interrupted. In a manner similar to that described above with respect to frame reception, a processing core suspends application processing and software interrupt servicing in response to a hardware interrupt. In the example illustrated in FIG. 6, the NIC driver may handle the hardware interrupt by reading the transmission identifier and scheduling a software interrupt. The purpose of this hardware interrupt is to verify whether a frame was actually sent. After the software interrupt is serviced, a processing core may resume application processing. It should be noted that two-way communication applications (e.g., video conferencing) may cause multiple frames to be sent and received at high rates, which in turn may generate a significant number of interrupts. As described above, a typical operating system may simply cause all of the interrupts to be handled in an arbitrary manner such that processing cores are not utilized efficiently.

Figure 7:
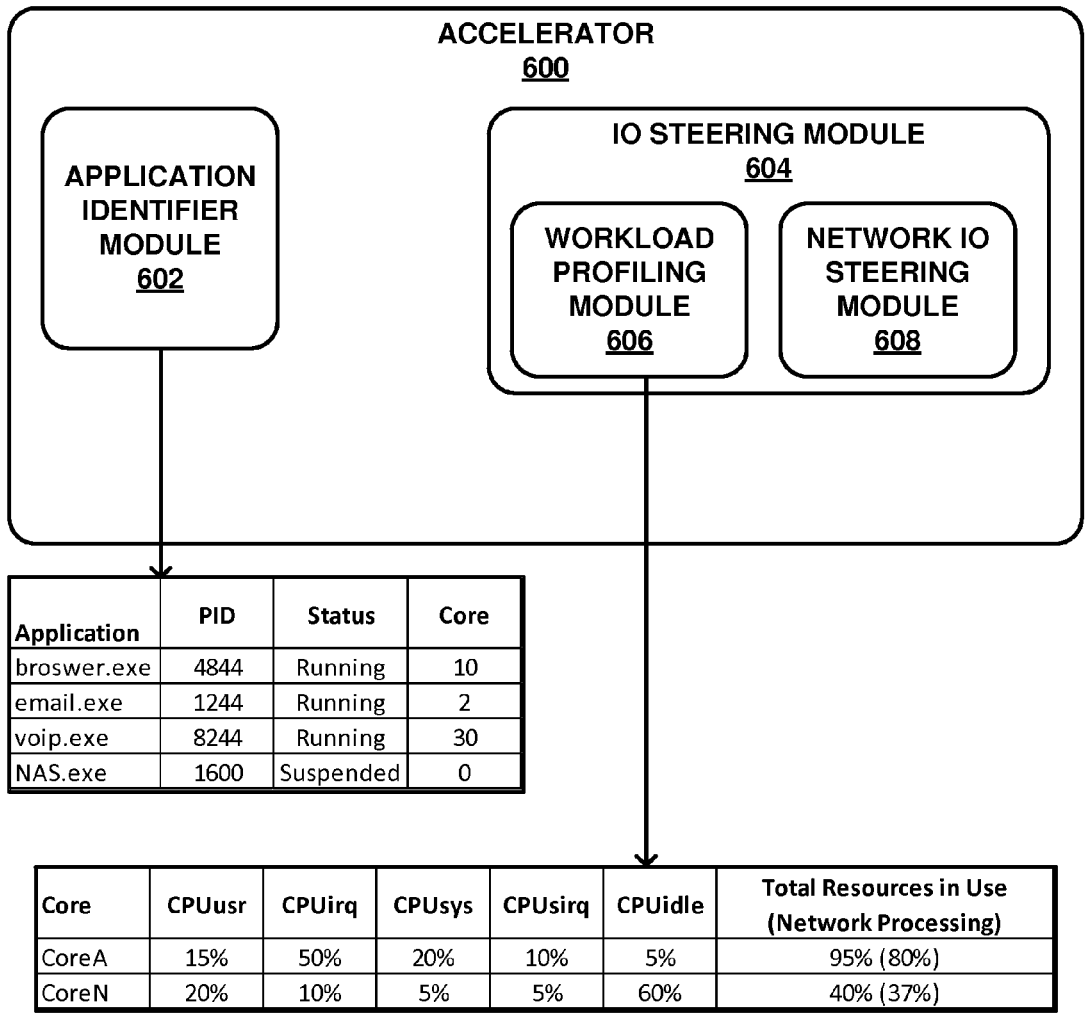
FIG. 7 is a conceptual diagram illustrating an example of logical architecture that may implement one or more techniques of this disclosure.

Referring again to FIG. 2 and FIG. 3, an operating system or a kernel may include an accelerator 600. Accelerator 600 may include a dynamic scheduler function which can be applied to any emerging heterogeneous multi-core processor systems which employs an interrupt driven I/O mechanism. A scheduler function may dynamically identify and quantify certain aspects of a system in order to improve the data processing efficiency, both over the network and on storage by effectively utilizing the immense parallelism that multi-core processors provide. FIG. 7 is a conceptual diagram illustrating an example of logical architecture that may implement one or more techniques of this disclosure. As illustrated in FIG. 7, accelerator 600 includes application identifier module 602 and IO steering module 604.

Application Identifier Module (AIM) 602 may be configured to maintain and track the state of designated applications. In one example, application identifier module 602 uses a set of predefined rules to determine applications to be tracked. In one example, application identifier module 602 uses a set of predefined rules to determine an application from the application layer data. For the purposes of application identifier module 602, an application can be any piece of software that may establish a stateful/stateless network connection with any remote/local entity and/or ultimately perform an I/O-instruction on any storage media connected to a host. In one example, application identifier module 602 identifies tasks (applications) that are responsible for generating a CPU workload. This identification may be made possible offline by specifying the applications to be monitored (e.g., using a predefined set of rules). In one example, the applications are selected based on their computational complexity and network utilization characteristics. In the example illustrated in FIG. 7, application identifier module 602 monitors a web browser application, an email application, a voice-over-IP application, and a network attached storage application. It should be noted that a computing device or a router may be running other applications, e.g., a word processing application. Thus, application identifier module 602 may be configured to monitor the state of a subset of applications currently running on a computing device or a routing device, where such applications are selected based on their computational complexity and/or network utilization characteristics.

In the example illustrated in FIG. 7, a table including applications identified by application identifier module 602 is illustrated and for each application an associated process identifier (PID), status, and an associated core (e.g., core or cores running application) are shown. In one example, application identifier module 602, updates runtime information of identified applications as follows: (a) If the process has been killed, then the state information of the process is removed from the task list; (b) If the process has been restarted, then the state information for the application is updated and the tracking information is reset in the task list. Application identifier module 602 makes application information available to IO steering module 604.

IO steering module 604 may be configured to improve system performance by enabling one or more of runtime task allocation, hardware interrupt mitigation, and software interrupt steering. As illustrated in FIG. 7, IO steering module 604 includes workload profiling module 606 and network IO steering module 608. In one example, workload profiling module 606 may include a simple profiler module that gathers and processes sufficient information to determine the CPU workload and any IO bottlenecks in the system. In one example, workload profiling module 606 may obtain CPU workload information from application identifier module 602 and provide profiling information to IO steering module 608.

In one example, profiling information may include one or more of the following types of profiling information: (a) The task (application) utilization time ($CPU_{usr}$) based on the number of processing cycles or CPU utilization of a particular task listed by application identifier module; (b) The load on a processor core due to the hardware interrupts and the total CPU cycles spent on processing them ($CPU_{IRQ}$); (c) The total CPU cycles spent on processing network packets both on receive and transmit paths, which represents the system service time ($CPU_{sys}$); (d) The CPU utilization for generating and processing software interrupts ($CPU_{SIRQ}$); and (e) The total amount of time a CPU is IDLE ($CPU_{IDLE}$), each of which may be specified in percentages and total 100%. In the example illustrated in FIG. 6, each of these types of profiling information are used to determine the total resources in use for a core (e.g., CoreA 95% and CoreN 40%). Further, as illustrated in FIG. 6, the total resources in use due to network processing may be determined. For example, total resources in use due to network processing may be determined by identifying resources associated with an application that communicates with a network.

IO steering module 608 may obtain profiling information from the workload profiler 606 and quantify the profile information for use by an algorithm. The example algorithm mitigates problems arising due to imbalance in processing time and CPU utilization overload. The algorithm may be configured to perform one or more of runtime task allocation, hardware interrupt mitigation, and/or software interrupt steering. In one example, the algorithm may mainly be focused on runtime profiling and scheduling of processes and interrupts for network applications. Example algorithms are described in greater detail below with respect to FIG. 9 and FIG. 10.

Runtime task allocation may determine which tasks are to be balanced across different cores to avoid bottlenecks. For example, an algorithm may determine that tasks associated with a particularly computationally complex application (e.g., a 3D animation application) should be handled by a processing core that is currently idle. In one example runtime task allocation may include scheduling and/or steering network applications to a processing core. Network applications may include rudimentary and/or complex network applications.

Hardware interrupt mitigation may disable hardware interrupts per core. Disabling hardware interrupts per core may be thought of as Hard IRQ steering to properly choose cores that handle the interrupts invoked by a device (e.g., hard IRQs invoked by NIC due to frame reception). One example of disabling hardware interrupts per core includes setting an interrupt affinity for a driver (e.g., NIC driver) using the affinity property, smp_affinity, provided in Linux. As described above, overwhelming reception of frames or packets increases the hardware interrupts, which may overload a single or multiple cores, thus suspending background tasks and software interrupt service routines. By effectively steering hardware interrupts to single or fixed set of CPU cores, it is possible to overcome large variations in execution times of background tasks due to preempting. Effectively steering hardware interrupts can also ensure that the necessary instructions are always available in the associated low level instruction caches to avoid precious compute cycles used to access the main memory and thus increasing efficiency of instruction processing.

Figure 8:
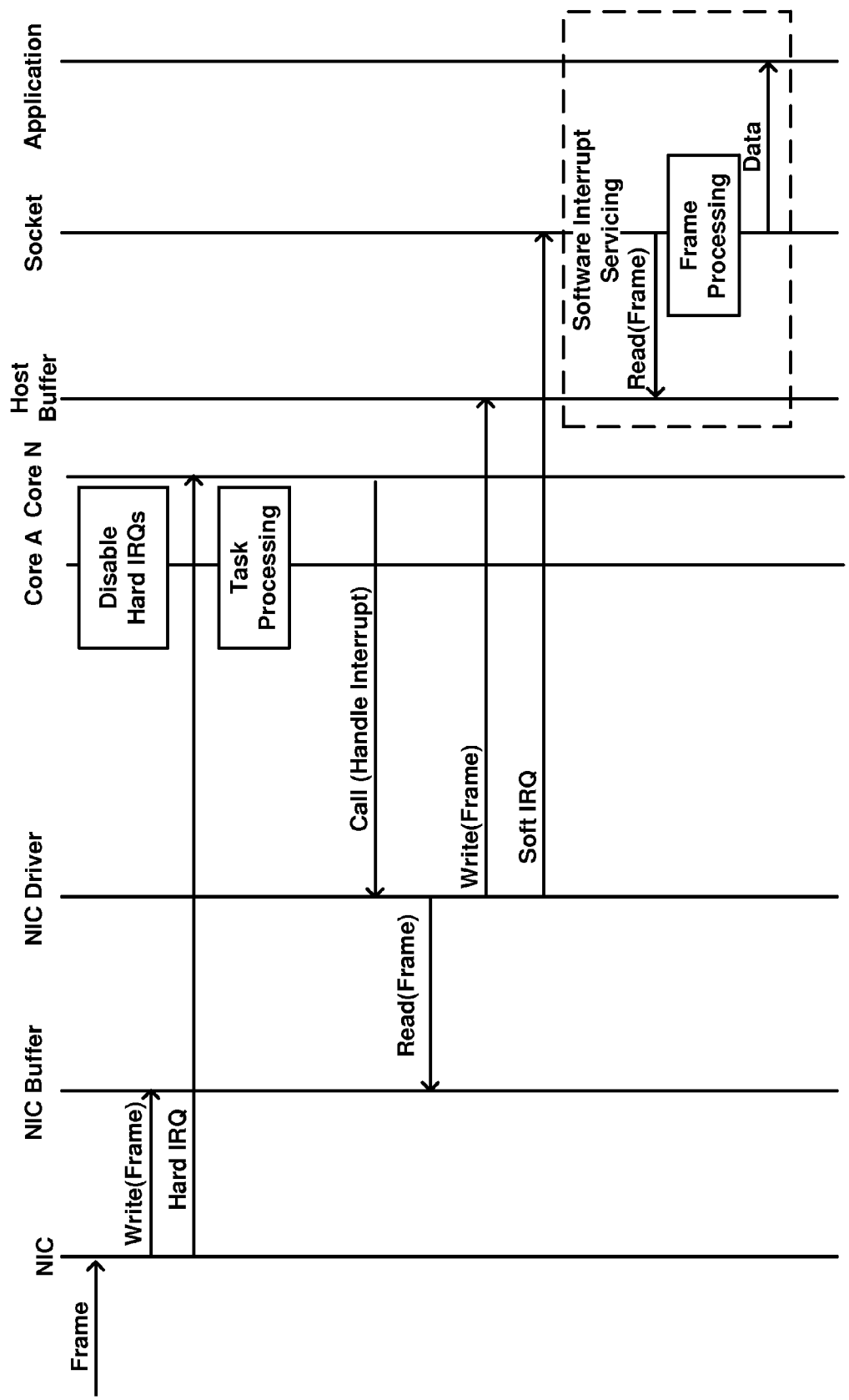
FIG. 8 is a conceptual diagram illustrating an example of a data processing flow according to one or more techniques of this disclosure.

FIG. 8 is a conceptual diagram illustrating an example of a data processing flow according to one or more techniques of this disclosure. FIG. 8 illustrates an example of hardware interrupt mitigation. As illustrated in FIG. 8, hardware interrupts are disabled on core A. Thus, when a hardware interrupt is generated due to a frame being received by NIC, the hardware interrupts core N and not core A. In this manner, as illustrated in FIG. 8, core A may resume task processing, uninterrupted, while hardware interrupts are handled by core N. In this manner, performance of an application associated with task being processed by core A may not be affected by network I/O.

As described above, IO steering module 608 may also perform software interrupt steering. Software interrupt steering may be used to reduce the likelihood of different software interrupt service handlers that are running in different contexts to either overload or starve CPU cores. Hardware interrupt mitigation and software interrupt steering may be based on an interrupt steering algorithm. An example interrupt steering algorithm may be configured to make crucial decision for steering the I/O processing to relatively free cores based on the example profiling information described above. In one example, an interrupt steering algorithm may determine a single or a subset of cores should handle interrupts to balance the processing time caused due to network processing.

In one example, in order to determine which core or subset of cores should handle interrupts, an interrupt steering algorithm determines the total resources in use for a core. As described above, in one example, the total resources in use for a core may be determined by calculating the total CPU cycles consumed by all the tasks currently utilizing the CPU resources. The algorithm may then steer interrupts and/or tasks to a single or subset of cores, e.g., if the resource utilization is less than the utilization of the core that the process is currently residing on. As described above, steering interrupts may include disabling hardware interrupts for a core and/or scheduling software interrupts for a core. In the example illustrated in FIG. 7, 95% of core A's resources are in use and 40% of core N's resources are in use. Thus, in this case, hardware interrupts may be disabled for core A and thereby handled by core N. Further, in this case software interrupts may be steered to core N.

As described above, application identifier module 602 may constantly monitor and update the status of applications. In a similar manner, in order to adapt to the ever changing characteristics of a network, IO steering module 604 may continually monitor parameters, (e.g., $CPU_{USR}$, $CPU_{IRQ}$, $CPU_{SYS}$, $CPU_{SIRQ}$, and/or $CPU_{IDLE}$) to dynamically adapt its steering strategy. A steering algorithm may ensure that during the steering process, the I/O interrupts and tasks being steered do not overload a new CPU subset to which it is newly assigned to. For example, if by disabling hardware interrupts on core A, core N gets overloaded (e.g., due to a packet burst), then hardware interrupts may be enabled on another core and/or disabled on core N to balance processing loads. Further, in this example, software interrupts servicing may be handled by a core other than core N. This may be in additional to or as an alternative to disabling hardware interrupts on core N. Thus, in one instance, core A could primarily handle runtime tasks, core N could primarily handle network I/O hardware interrupts, and another core could primarily handle network I/O software interrupts. In some examples, a technique of steering can sometimes be termed as near arbitrary. However, in other examples steering can be configured to follow a fixed set of rules. For example, a steering algorithm may be configured to disable hardware interrupts only when the resources utilized by a core exceeds 50%.

Figure 9:
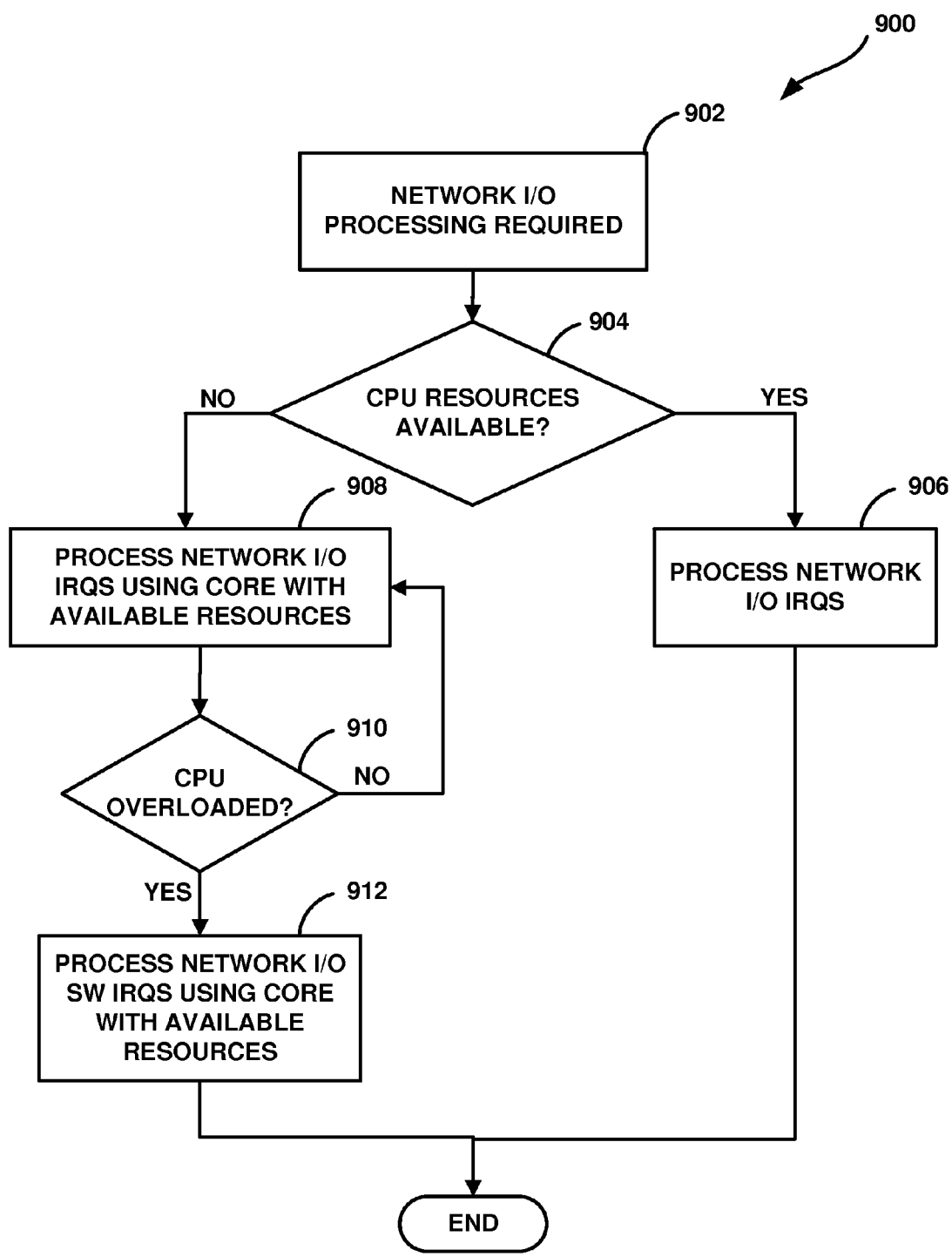
FIG. 9 is a flowchart illustrating an example method for managing network processing according to one or more techniques of this disclosure.

FIG. 9 is a flowchart illustrating an example algorithm that may allow network I/O interrupts to be handled in an efficient manner. The algorithm in FIG. 9 may be arbitrary in some aspects and may follow a fixed set of rules in other aspects. As illustrated in FIG. 9, process 900 begins when network I/O processing is required (902). That is, a frame is received or a frame needs to be sent. Upon, a network I/O processing requirement, it may be determined whether a default core or set of cores (e.g., core A) has resources available to efficiently process the required network processing (904). For example, if a core already has a high percentage (e.g., 50%) of resources in use, the processing may be done by another core. As illustrated in FIG. 9, if the default core has sufficient resources available, the core may process network I/O interrupts (906). In the example illustrated in FIG. 9, if a default core already has a high percentage of resources in use, the processing may be done by another core. That is, network hardware and software interrupts may be allocated to another core or set of cores (908).

As described above, a packet burst or other system changes (e.g., an application requiring resources) may cause a core handling network hardware interrupts and network software interrupts to become overloaded. Thus, as illustrated in FIG. 9, a determination can be made whether (e.g., by monitoring applications and/or CPU resources) a core handling network hardware and software interrupts has become overloaded (910). For example, if a core or set of cores has over 75% of its resources allocated. In the case where it is determined that a core has not become overloaded, it may continue handling network hardware interrupts and network software interrupts. In the case where it is determined that a core has become overloaded due to handling network hardware interrupts and network software interrupts, network software interrupts may be handled by a core having available resources (912). Thus, as described above, a first core may primary handle runtime processing, a second core may primarily handle network hardware IRQs, and a third core may primarily handle network software IRQs. It should be noted that in one example, an IO steering algorithm may try to ensure that a network application and its respective IO tasks and interrupts which are dependent on each other are locally residing on the same core to reduce the impact of overhead due to inter processor interrupts, cache misses, etc. For example, in a case where it is determined that total resource utilization of core N exceeds 80%, IO steering algorithm may still schedule a software interrupt on core N, if core N handled an associated hardware interrupt. Thus, the determination whether a core is overloaded may be based on resources utilized by a core and overall processing efficiencies. In this manner, process 900 represents an example of an algorithm configured to manage network processing.

Figure 10:
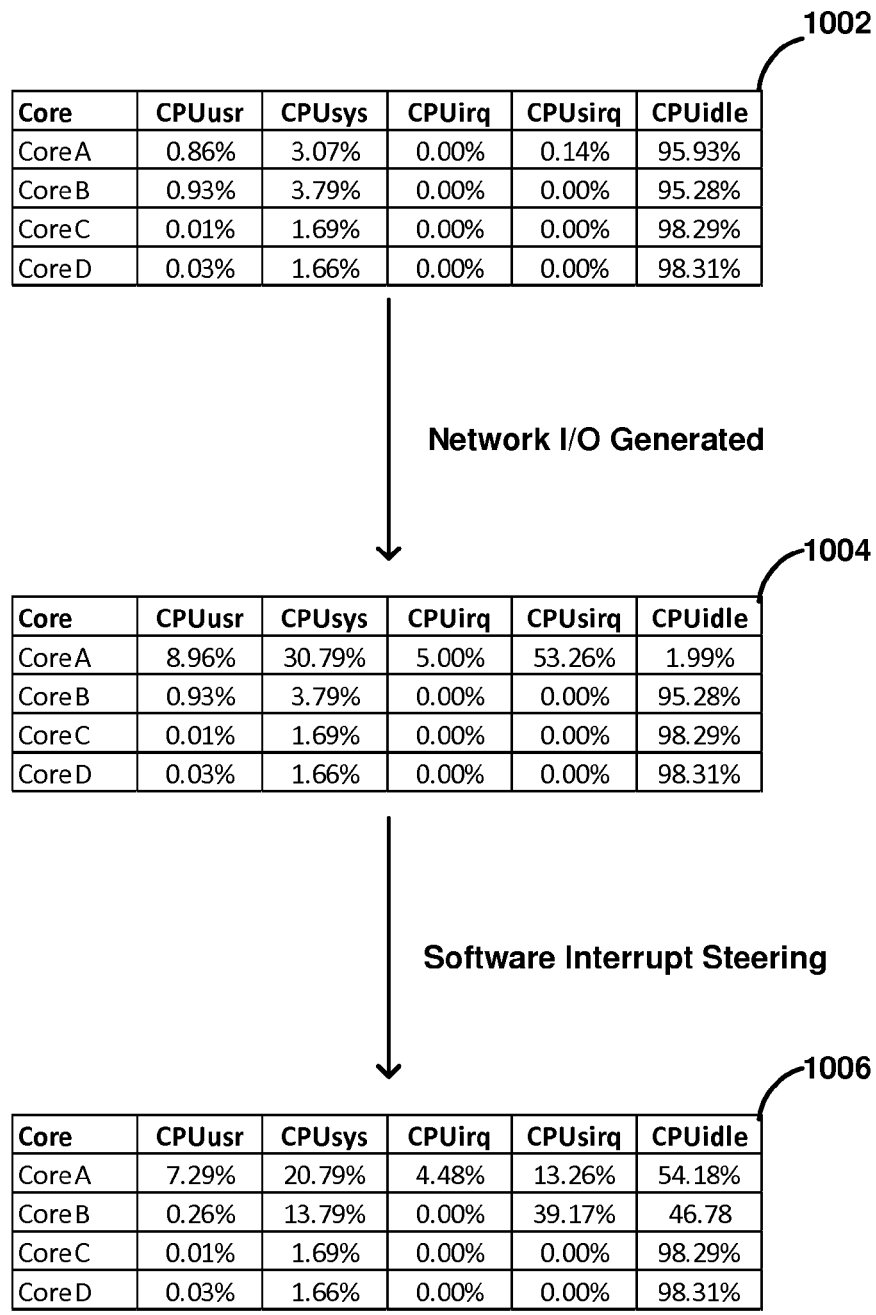
FIG. 10 is a conceptual diagram illustrating an example method for managing network processing according to one or more techniques of this disclosure.

As described above, the techniques described herein may improve performance of high data transfer applications. FIG. 10 is a conceptual diagram illustrating how performance may be improved by implementing one or more of the techniques described herein. The example illustrated in FIG. 10 may be applicable to processor 202 or processor 302. In the example illustrated in FIG. 10, a processor includes four cores. Table 1002 shows resource allocation when a device is in its idle state. That is, no network workload is present. As illustrated in table 1002, each of the cores have a large percentage of resources available. Table 1004 shows resource allocation when a network workload is tasked to the processor. One example application that may cause a network workload to be tasked to the processor is getting data from external network storage and copying it to a local hard disk drive. As table 1004 illustrates CoreA is spending a significant amount of time trying to handle the software interrupt service routines and as a result CoreA is almost completely occupied. In this example, performing hardware interrupt mitigation will do little to free resources from CoreA, as only 5% of CoreA's resources are occupied due to hardware interrupt handling. Further, runtime task allocation may not efficiently free resources of CoreA. In this case, software interrupt servicing is causing the bottleneck at CoreA, i.e., occupying of 50% of CoreA's resources. Thus, in this case, as illustrated in table 1006, software interrupts may be steered to CoreB.

In the example illustrated in FIG. 10, a bottleneck, i.e., a source of processing inefficiency, is identified and mitigated accordingly. In the example illustrated in FIG. 10 a bottleneck may be identified as one of $CPU_{usr}$, $CPU_{IRQ}$, $CPU_{sys}$, and $CPU_{SIRQ}$, and the bottleneck may be mitigated using one or more of the mitigation techniques describe herein, e.g., runtime task, allocation, hardware interrupt mitigation, or software interruption. This example process may be described as (a) determining whether a core handling a network workload is overloaded, where overload may be defined in one example as having less a threshold percentage (e.g., 5%-25%) of processing resources available. It should be noted that a higher threshold percentage may serve to prevent a core from actually becoming overloaded. That is, for example, a core may not actually be physically overloaded with 75% of its resources allocated, but when 75% of its resources are allocated there may be a high likelihood that soon all of its resources may become allocated. Thus, a determination of a core being overloaded may correspond to a likelihood of becoming overloaded. It should be noted that in other examples an overload may be determined based on any of $CPU_{usr}$, $CPU_{IRQ}$, $CPU_{sys}$, or $CPU_{SIRQ}$ exceeding a threshold percentage, e.g., $CPU_{IRQ}$ exceeding 25%; (b) upon determining that a core is overload, determining a bottleneck. In one example, a bottleneck may include determining which of $CPU_{usr}$, $CPU_{IRQ}$, $CPU_{sys}$, or $CPU_{SIRQ}$ is utilizing the highest percentage of processing resources of the core. In another example, a bottleneck may be determined by comparing $CPU_{usr}$, $CPU_{IRQ}$, $CPU_{sys}$, or $CPU_{SIRQ}$ to a threshold value; and (c) performing one or more mitigation techniques based at least in part on the determined bottleneck, e.g., on which of $CPU_{usr}$, $CPU_{IRQ}$, $CPU_{sys}$, or $CPU_{SIRQ}$ is utilizing the highest percentage of processing resources of the core. In the example illustrated in FIG. 10, $CPU_{SIRQ}$ is determined to be the bottleneck and software interrupt steering is performed. As described above, mitigation techniques may include runtime task, allocation, hardware interrupt mitigation, or software interrupt steering.

In the example illustrated in FIG. 10 mitigating the software interrupt workload by steering software interrupts to CoreB causes the overall device processing load to be balanced between CoreA and CoreB. That is, each of the cores are utilizing about 50% of their resources. In practice such balancing may result in performance improvements from 10% to 50%. In one instance, the example techniques described herein have been demonstrated to improve exFAT network write speeds from 72 MB/s to 112 MB/s. Thus, the example techniques described herein that may be implemented by accelerator 600 may provide significant improvements to network IO workload processing.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media.

Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of managing network processing on a processing unit including multiple processing cores, the method comprising:
   monitoring task utilization time, processing load due to hardware interrupts, system service time, processing load due to software interrupts, and idle time for a processing core;
   determining whether a processing load due to hardware interrupts exceeds a threshold percentage;
   determining whether a processing load due to software interrupts exceeds a threshold percentage;
   upon determining the processing load due to hardware interrupts exceeds a threshold, disabling hardware interrupts on the processing core; and
   upon determining the processing load due to software interrupts exceeds a threshold, scheduling software interrupt servicing on a processing core other than the processing core.

2. The method of claim 1, wherein scheduling software interrupt servicing on a processing core other than the processing core includes scheduling software interrupt servicing such that dependency is maintained.

3. A non-transitory computer-readable storage medium comprising instructions stored thereon, that upon execution, cause one or more processors of a device to:
   monitor task utilization time, processing load due to hardware interrupts, system service time, processing load due to software interrupts, and idle time for a processing core of a processing unit including multiple processing cores;
   determine whether a processing load due to hardware interrupts exceeds a threshold percentage;
   determine whether a processing load due to software interrupts exceeds a threshold percentage;
   disable hardware interrupts on the processing core, upon determining the processing load due to hardware interrupts exceeds a threshold; and
   schedule software interrupt servicing on a processing core other than the processing core, upon determining the processing load due to software interrupts exceeds a threshold.

4. The non-transitory computer-readable storage medium of claim 3, wherein scheduling software interrupt servicing on a core other than the processing core includes scheduling software interrupt servicing such that dependency is maintained.

5. The method of claim 1, wherein disabling hardware interrupts on the processing core includes setting an affinity interrupt for a driver.

6. The method of claim 1, wherein disabling hardware interrupts on the processing core causes another processing core to handle subsequent network input/output hardware interrupts, and further comprising determining whether a processing load due to hardware interrupts exceeds a threshold percentage for the processing core handling subsequent network input/output hardware interrupts; and
   disabling hardware interrupts on the processing core handling subsequent network input/output hardware interrupts upon determining the processing load due to hardware interrupts exceeds a threshold percentage.

7. The method of claim 1, wherein disabling hardware interrupts on the processing core causes another processing core to handle subsequent network input/output hardware interrupts, and further comprising determining whether the processing core handling subsequent hardware interrupts has less than a threshold percentage of its resources available based on monitoring task utilization time, processing load due to hardware interrupts, system service time, processing load due to software interrupts, and idle time; and
   upon determining the processing core handling subsequent network input/output hardware interrupts has less than a threshold percentage of its resources available:
      disabling hardware interrupts on the processing core handling subsequent network input/output hardware interrupts upon determining the processing load due to hardware interrupts exceeds a threshold.

8. The method of claim 1, wherein disabling hardware interrupts on the processing core causes another processing core to handle subsequent network input/output hardware interrupts, and further comprising determining whether the processing core handling subsequent network input/output hardware interrupts has less than a threshold percentage of its resources available based on monitoring task utilization time, processing load due to hardware interrupts, system service time, processing load due to software interrupts, and idle time; and
   upon determining the processing core handling subsequent network input/output hardware interrupts has less than a threshold percentage of its resources available, performing one or more of:
      disabling hardware interrupts on the processing core handling subsequent network input/output hardware interrupts upon determining the processing load due to hardware interrupts exceeds a threshold;
      scheduling software interrupt servicing on a processing core other than the processing core handling subsequent network input/output hardware interrupts, upon determining the processing load due to software interrupts exceeds a threshold; and performing runtime task allocation for the processing core handling subsequent network input/output hardware interrupts.

9. The method of claim 1, further comprising determining whether the processing core handling subsequent software interrupt servicing has less than a threshold percentage of its resources available based on monitoring task utilization time, processing load due to hardware interrupts, system service time, processing load due to software interrupts, and idle time.

10. The method of claim 9, wherein the threshold percentage is within a range of 5%-25%.

11. The non-transitory computer-readable storage medium of claim 3, wherein disabling hardware interrupts on the processing core includes setting an affinity interrupt for a driver.

12. The non-transitory computer-readable storage medium of claim 3, wherein disabling hardware interrupts on the processing core causes another processing core to handle subsequent network input/output hardware interrupts, and wherein the instructions further cause one or more processors of a device to:
 determine whether a processing load due to hardware interrupts exceeds a threshold percentage for the processing core handling subsequent network input/output hardware interrupts; and
 disable hardware interrupts on the processing core handling subsequent network input/output hardware interrupts upon determining the processing load due to hardware interrupts exceeds a threshold percentage.

13. The non-transitory computer-readable storage medium of claim 3, wherein disabling hardware interrupts on the processing core causes another processing core to handle subsequent network input/output hardware interrupts, and wherein the instructions further cause one or more processors of a device to:
 determine whether the processing core handling subsequent network input/output hardware interrupts has less than a threshold percentage of its resources available based on monitoring task utilization time, processing load due to hardware interrupts, system service time, processing load due to software interrupts, and idle time; and
 upon determining the processing core handling subsequent network input/output hardware interrupts has less than a threshold percentage of its resources available:
  disable hardware interrupts on the processing core handling subsequent network input/output hardware interrupts upon determining the processing load due to hardware interrupts exceeds a threshold.

14. The non-transitory computer-readable storage medium of claim 3, wherein disabling hardware interrupts on the processing core causes another processing core to handle subsequent network input/output hardware interrupts, and wherein the instructions further cause one or more processors of a device to:
 determine whether the processing core handling subsequent network input/output hardware interrupts has less than a threshold percentage of its resources available based on monitoring task utilization time, processing load due to hardware interrupts, system service time, processing load due to software interrupts, and idle time; and
 upon determining the processing core handling subsequent network input/output hardware interrupts has less than a threshold percentage of its resources available:
  disable hardware interrupts on the processing core handling subsequent network input/output hardware interrupts upon determining the processing load due to hardware interrupts exceeds a threshold;
  schedule software interrupt servicing on a processing core other than the processing core handling subsequent network input/output hardware interrupts, upon determining the processing load due to software interrupts exceeds a threshold; and
  perform runtime task allocation for the processing core handling subsequent network input/output hardware interrupts.

15. The non-transitory computer-readable storage medium of claim 3, wherein the instructions further cause one or more processors of a device to determine whether the processing core handling subsequent software interrupt servicing has less than a threshold percentage of its resources available based on monitoring task utilization time, processing load due to hardware interrupts, system service time, processing load due to software interrupts, and idle time.

16. The non-transitory computer-readable storage medium of claim 3, wherein the threshold percentage is within a range of 5%-25%.

17. A device for managing network processing on a central processing unit including multiple cores comprising one or more processors configured to:
 monitor task utilization time, processing load due to hardware interrupts, system service time, processing load due to software interrupts, and idle time for a processing core of a processing unit including multiple processing cores;
 determine whether a processing core has less than a threshold percentage of its resources available based on the monitored task utilization time, processing load due to hardware interrupts, system service time, processing load due to software interrupts, and idle time for a processing core of a processing unit including multiple processing cores;
 upon determining the processing core has less than a threshold percentage of its resources available:
  determine whether processing load due to hardware interrupts exceeds a threshold percentage, and
  determine whether processing load due to software interrupts exceeds a threshold percentage;
  disable hardware interrupts on the processing core, upon determining the processing load due to interrupts exceeds a threshold; and
  schedule software interrupt servicing on a processing core other than the processing core, upon determining the processing load due to software interrupts exceeds a threshold.

18. The device of claim 17, wherein the threshold percentage is within a range of 5%-25%.

19. The device of claim 17, wherein disabling hardware interrupts on the processing core includes setting an affinity interrupt for a driver.

20. The device of claim 17, wherein scheduling software interrupt servicing on a core other than the processing core includes scheduling software interrupt such that dependency is maintained.

21. The device of claim 17, wherein the device further includes a network interface controller.

22. The device of claim 17, wherein the device includes a router device configured to enable a storage device to be used as a network attached storage device.

* * * * *